Feb. 20, 1945.   A. H. MORGAN   2,369,910
RIVETING TOOL
Filed Feb. 5, 1943
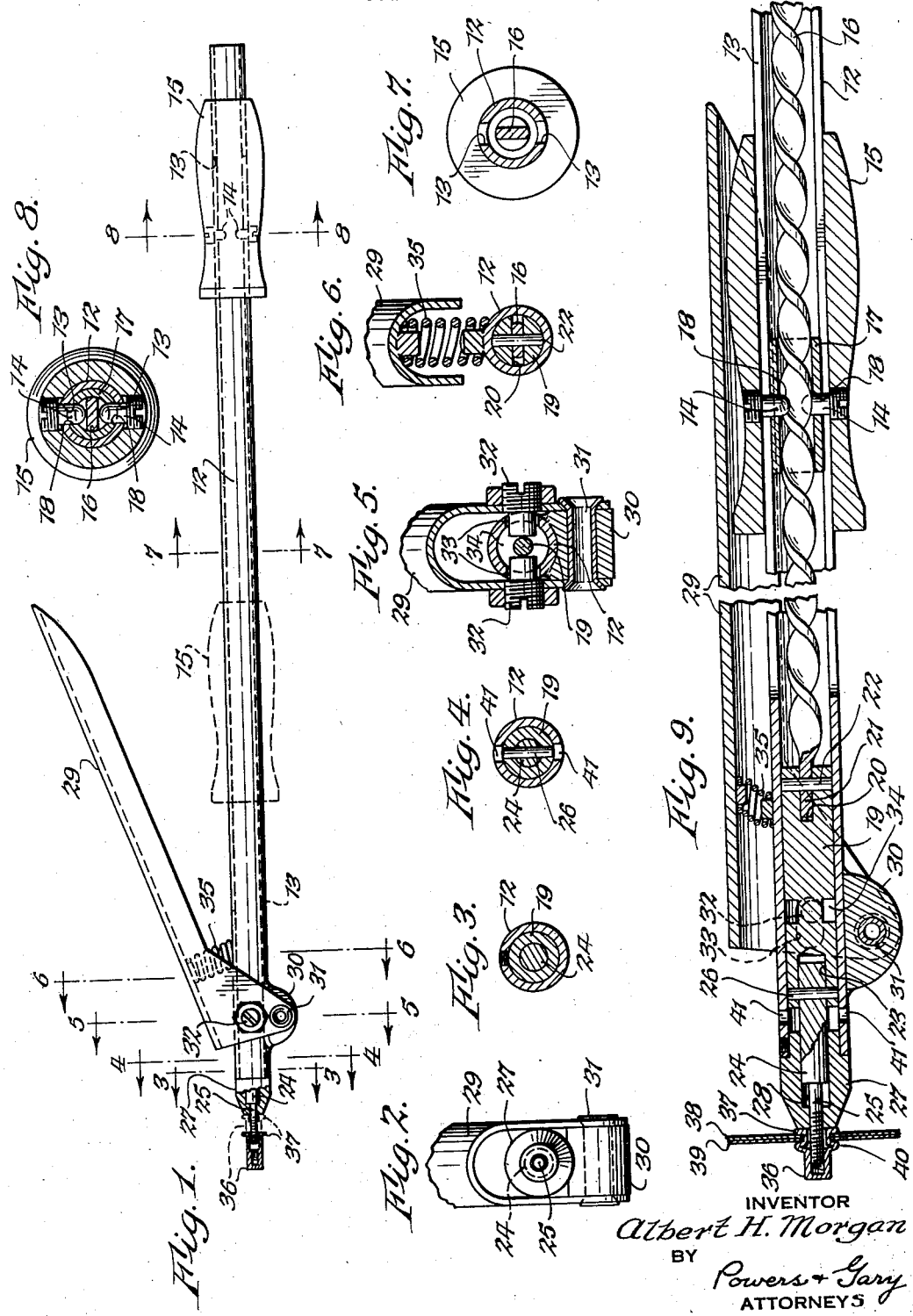
INVENTOR
Albert H. Morgan
BY
Powers & Gary
ATTORNEYS Patented Feb. 20, 1945

2,369,910

UNITED STATES PATENT OFFICE 2,369,910

RIVETING TOOL

Albert H. Morgan, Williamsville, N. Y.

Application February 5, 1943, Serial No. 474,838

3 Claims. (Cl. 218—19)

This invention relates to improvements in tools for applying tubular rivets of the kind having internally threaded bores so that they may be detachably connected to said tools and the latter thereupon actuated to draw the ends of the shanks of the rivets toward the pre-formed heads and by such shortening operation effect the desired expansion of the shanks.

Tools for the purpose described, although not limited to such use, are adapted particularly for operations wherein the parts to be riveted enclose the shanks of the rivets in such a manner that, being inaccessible, they cannot be expanded by direct external application of the necessary compression forces. Such tools, therefore, are characterized by a threaded stem which is adapted to enter and screw into the bore of a rivet, which is movable axially when the rivet is so attached to expand the shank of the rivet, and which thereafter may be unscrewed to disconnect it from the rivet.

One object of the invention is a tool which is so designed that the connection of the threaded stem to, and its disconnection from, the rivets may be effected rapidly and with a minimum of effort, this object contemplating the construction of the tool in such a manner that the direction of the force which is exerted in turning the threaded stem to disconnect it from a rivet upon completion of the expanding operation will be along a line collinear with the axis of the stem and hence will not impair the rivet connection or wear excessively, or break, the stem.

A further object is to provide for facility in removing and replacing the threaded stem in the event that the latter should be broken or become worn to such a degree as to no longer be serviceable.

A still further object is a novel design and arrangement of the parts of the tool, whereby to obtain simplicity in construction and ease and speed in operation.

The invention is illustrated in the accompanying drawing in which:

Figure 1 is a side elevational view of a tool embodying the features of the invention.

Figure 2 is a front end elevation of the tool.

Figures 3, 4, 5, 6, 7 and 8 are enlarged transverse sections taken along lines 3—3, 4—4, 5—5, 6—6, 7—7 and 8—8, respectively, of Figure 1.

Figure 9 is an enlarged sectional view illustrating the positions of the actuating lever and threaded stem upon completion of the expanding stroke.

The tool, as illustrated, includes a barrel 12 which is formed with diametrically opposed, longitudinally extending slots 13. The latter provide guideways for opposed pins 14 which are carried by a sleeve 15 and which are located in, but at opposite sides of, the helical groove of a screw 16, the sleeve 15 being adapted to provide a handhold and being slidable along the barrel 12 in one direction to rotate the screw 16 clockwise and being slidable in the opposite direction to rotate the screw counterclockwise. The limits of the range of movement of the sleeve 15 are determined by the location of the ends of the slots 13.

The screw 16, which is preferably substantially smaller in diameter than the internal diameter of the barrel, is supported in concentric relation with the barrel by a bearing sleeve 17 which is located within the barrel and which is formed with opposed openings 18 through which the pins 14 pass. The sleeve 17 is adapted to be moved by and with the sleeve 15 and serves to provide a bearing of relatively small area which is always located opposite the points at which the pins 14 are acting against the walls of the spiral groove of the screw 16. Turning resistance is thus reduced to a minimum. The opposite end of the screw is connected to, and is supported coaxially of the barrel, by a coupling 19. The latter is in the form of a plunger and at its inner end is formed with a transverse slot 20 for accommodating a rectangularly-shaped extension 21 of the screw, the extension being secured in the slot 20 by a pin 22. At its outer end the coupling 19 is formed with a socket 23 for accommodating the shank 24 of a stem 25, the shank being secured in the socket by a cross-pin 26 and the outer end of the stem being threaded. Rotary movements of the screw 16 will, therefore, be transmitted to the stem by the coupling 19.

A head 27 which is suitably secured in the adjacent end of the barrel 12 is formed with an axial bore 28 for accommodating the stem 25. The enlarged inner end of the bore provides a guide for the enlarged shank of the stem while the reduced outer end of the bore is large enough to accommodate, with suitable clearance, the reduced outer end of the stem, the said head tapering in the direction of its outer end and terminating in a flat annular wall, or seat, which surrounds the stem 25. The head 27 constitutes a reaction member or anvil.

In order to retract the stem 25 a lever 29 is pivotally mounted upon a lug 30 which is carried by the barrel 12 in the vicinity of the head 27, the outer ends of a tubular element 31, which is carried by the lug and which extends transversely of the barrel, providing pivots to which lateral extensions on the lever are connected. Opposed pins 32 which are carried by the same extensions project through slots 33 in the barrel and have terminal portions which are located in an annular channel 34 formed in the coupling 19. Normally the lever 29 is held in the extended position shown in Figure 1 by a spring 35 which is held in place between the barrel and the lever by suitable projections, one formed on the barrel and one on the lever. By depressing the lever (moving it toward the barrel against the action of the spring 35) the coupling 19 will be actuated to retract the stem 25 a predetermined distance, the spring 35 being automatically operative to restore the lever, and hence the stem, to its original position when the lever is released.

It will thus be apparent that by moving the sleeve 15 toward the head 27 the screw 16 will be rotated in a clockwise direction, such movement being transmitted by the coupling 19 to the stem 25, that by moving the sleeve 15 in the opposite direction the screw 16, and hence the stem, will be rotated in a counterclockwise direction, and that by depressing the lever 29 the coupling 19 may be moved axially to retract the stem.

A tubular rivet of the type for which the tool is designed is indicated at 36 (Figure 1). It is provided with a pre-formed head 37 in the form of an annular flange and the bore is reduced and threaded at its inner end and is enlarged in the vicinity of the head to weaken the wall of this portion of the shank. In applying the rivet it is held between the thumb and a finger of the operator so that threaded end of the stem 25 will enter and engage the threaded section of the bore of the rivet, the head end of the tool resting in the palm of the same hand. The sleeve 15, which is normally located at the outer end of the barrel 12, is grasped by the other hand and is moved along the barrel toward the head of the tool. During such movement, the rivet being held stationary and in proper alignment with the stem, the latter is screwed into the threaded section of the bore. Preferably the stem 25, when in its normal position, extends beyond the seat on the head 27 such a distance that when the desired number of threads in the rivet have been engaged the head of the rivet abuts or is loctaed in close proximity to such seat. The tool may then be manipulated to insert the rivet through the parts 38 and 39 (Figure 9), or part, to which the rivet is to be applied, and while the head of the rivet is held against the part 38 the lever 29 is depressed to retract the stem 25. During this movement of the stem the head of the tool holds the pre-formed head of the rivet against the part 38 while the threaded section of the shank is drawn toward the pre-formed head. The weakened portion of the rivet shank is thereby expanded as indicated at 40 to form an annular enlargement which engages the wall 39, the final part of the retractory movement of the stem increasing to the desired degree the pressure with which the engaged parts are held between the pre-formed head and the enlargement 40. The riveting operation being completed, the lever 29 is released. Thereupon the spring 35 is operative to restore the lever to its open, extended position, the barrel 12 being pushed axially away from the head of the rivet until the leading end of the shank of the stem 25 is engaged by the shoulder at the juncture of the enlarged and reduced portions of the bore 28. Clearance is thus made between the barrel and the lever so that the sleeve 15 may be again fully clasped and moved along the barrel in the opposite direction. During this final movement of the sleeve the screw 16 is turned in a direction such that its movement will unscrew the stem 25 and thereby disengage it from the rivet, all parts being restored to their original positions upon completion of this operation.

The securement of the head 27 in the adjacent end of the barrel 12 is such as to permit its removal from the barrel in order to enable a worn stem 25 to be removed and a new one substituted. For thus securing the head 27 any suitable means may be employed, for example, a screw fastening as shown. The removal of a worn stem 25, in addition to the removal of the head 27, requires the removal of the cross-pin 26. For this purpose openings 41 are formed in the barrel 12 in alignment with the cross-pin 26 when the leading end of the shank stem 25 abuts the shoulder at the juncture of the enlarged and reduced portions of the bore 28. Ready access is thus provided to the cross-pin. Upon the removal of the head 27 and the worn stem 25, the shank 24 of the substituted stem is inserted in the socket 23 and secured by the cross-pin which is inserted through one of the openings 41. Thereupon the head 27 is inserted in the inner end of the barrel 12 and secured by its fastening means. The substitution of a new stem is thus an operation which calls for very slight labor and effort and which can be easily accomplished in a few moments of time.

From the foregoing it will be apparent that the sleeve 15 and screw 16 provide a high-speed drive for the stem 25. The screwing of the stem into a rivet preparatory to the expanding operation and the unscrewing of the stem upon completion of this operation are effected by relatively short strokes of the sleeve, a single stroke for each operation. Preferably the parts are so designed that only a portion of the permissible stroke of the sleeve 15 toward the head 27 is required to obtain the desired connection between the stem and a rivet, said sleeve at the completion of such partial stroke being so located with respect to the lever 29 that the hand in which the sleeve is clasped may be opened so that the thumb and palm may be readily moved to include the free end of the lever. The handhold provided by the sleeve, therefore, is employed in effecting both rotary and axial movements of the stem 25 and serves as a guard to prevent contact between the hand which is employed in operating the lever 29 and the edges of the slots 13. In this connection it will be noted that the movement of the sleeve 15 toward the outer end of the barrel to disconnect the stem from a rivet after completion of the expanding operation must, of necessity, occur when the rivet is fixed to the riveted part, or parts, and when any movement of the stem 25 except along a line collinear with the axis of the rivet will be objectionable because of the tendency to loosen the rivet or impair the connection, because of the resultant excessive wearing action to which the threads of the stem will be subjected, and because of the possibility of breaking the stem. The construction described avoids all of these objections as the force required to turn the stem 25 is applied to the sleeve 15 along a line coaxial with the screw, and hence along a line which is collinear with the axis of the rivet. In other words in moving the sleeve 15 toward the outer end of the barrel 12 the force which is employed naturally tends to take the direction required to effect disconnection of the stem and rivet in the desired manner.

I claim as my invention:

1. In a tool for applying tubular rivets, in combination: an elongated barrel having at its forward end a head constituting a reaction member or anvil and provided with a central co-axial opening, an element rotatably mounted in said opening and having an externally projecting portion threaded to engage the threads of a tubular rivet, a longitudinally-extending screw rotatably mounted within the barrel, a coupling member rotatably mounted within the barrel as a rotation transmitting connection between the screw and the element, a removable fastening connecting the coupling member and the element, an actuating sleeve mounted upon the barrel for co-axial movement, the barrel having a longitudinal slot, a projection carried by the sleeve and extending through the slot into engagement with the operating screw whereby the movement of the sleeve will effect the rotation of the screw, the barrel having an external projecting lug, a spring-loaded lever pivotally connected to the lug, pins carried by the lever at one side of its pivot and serving to transmit the movement of the lever to the coupling member, the barrel having slots through which the pins project and the coupling member being slidable within the barrel and having an annular groove in which the pins engage, the coupling member being movable to a position relative to the barrel in which, the screw and coupling member remaining within the barrel as a support, the removable fastening between the coupling member and the element is externally accessible for removal, thereby to enable the removal and replacement of the element.

2. In a tool for applying tubular rivets, in combination: an elongated barrel having at its forward end a head constituting a reaction member or anvil and provided with a central co-axial opening, an element rotatably mounted in said opening and having an externally projecting portion threaded to engage the threads of a tubular rivet, a longitudinally-extending screw rotatably mounted within the barrel, a coupling member rotatably mounted within the barrel as a rotation transmitting connection between the screw and the element, a removable fastening connecting the coupling member and the element, an actuating sleeve mounted upon the barrel for co-axial movement, the barrel having a longitudinal slot, a projection carried by the sleeve and extending through the slot into engagement with the operating screw whereby the movement of the sleeve will effect the rotation of the screw, the barrel having an external projecting lug, a spring-loaded lever pivotally connected to the lug, pins carried by the lever at one side of its pivot and serving to transmit the movement of the lever to the coupling member, the barrel having slots through which the pins project and the coupling member being slidable within the barrel and having an annular groove in which the pins engage, the barrel having an opening near its front end and the removable connection between the element and the coupling member registering with said opening in the advanced position of the coupling member, such registry enabling external access to the removable connection for the purpose of its removal and replacement.

3. In a tool for applying tubular rivets, in combination: an elongated barrel having at its forward end a head constituting a reaction member or anvil and provided with a central co-axial opening, an element rotatably mounted in said opening and having an externally projecting portion threaded to engage the threads of a tubular rivet, a longitudinally-extending screw rotatably mounted within the barrel, a coupling member rotatably mounted within the barrel as a rotation transmitting connection between the screw and the element, a removable fastening connecting the coupling member and the element, an actuating sleeve mounted upon the barrel for co-axial movement, the barrel having a longitudinal slot, a projection carried by the sleeve and extending through the slot into engagement with the operating screw whereby the movement of the sleeve will effect the rotation of the screw, a tubular bearing mounted within the barrel and surrounding and supporting the screw, the said projection carried by the sleeve extending through the tubular bearing whereby the bearing is movable lengthwise of the barrel with said sleeve, the barrel having an external projecting lug, a spring-loaded lever pivotally connected to the lug, pins carried by the lever at one side of its pivot and serving to transmit the movement of the lever to the coupling member, the barrel having slots through which the pins project and the coupling member being slidable within the barrel and having an annular groove in which the pins engage, the coupling member being movable to a position relative to the barrel in which, the screw and coupling member remaining within the barrel as a support, the removable fastening between the coupling member and the element is externally accessible for removal, thereby to enable the removal and replacement of the element.

ALBERT H. MORGAN.